Jan. 19, 1932.   LE ROY C. TRYON   1,841,995
MEASURING APPARATUS
Filed April 12, 1930   2 Sheets-Sheet 1

Inventor.
Le Roy C. Tryon
By Dyrenforth, Lee, Chritton and Wiles
Attys.

Jan. 19, 1932. LE ROY C. TRYON 1,841,995
MEASURING APPARATUS
Filed April 12, 1930 2 Sheets-Sheet 2
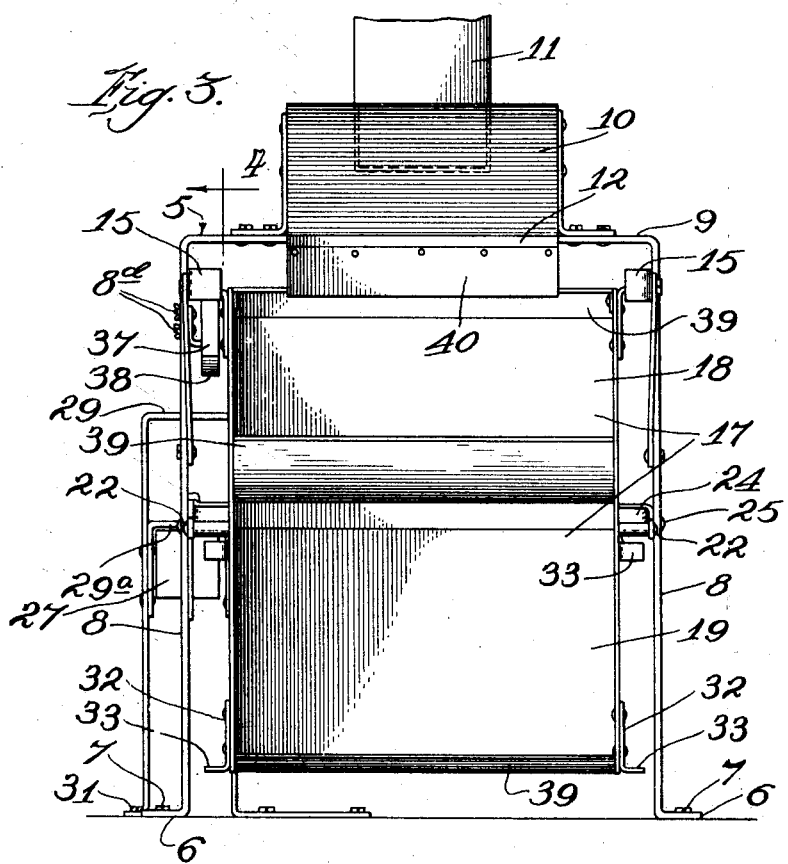
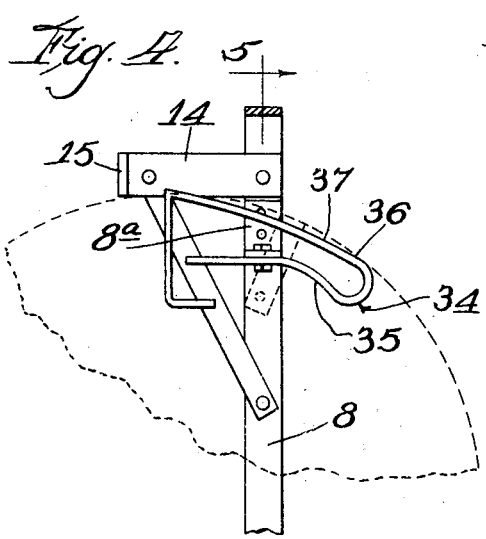
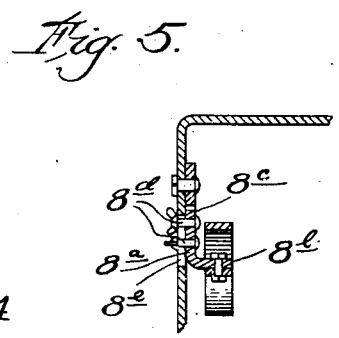

Patented Jan. 19, 1932

1,841,995

UNITED STATES PATENT OFFICE

LE ROY C. TRYON, OF CHICAGO, ILLINOIS

MEASURING APPARATUS

Application filed April 12, 1930. Serial No. 443,729.

My invention relates more particularly to mechanism for automatically measuring material such as, and more particularly, grain, and especially of the type comprising a rotatable receptacle-forming member into which the material is fed and which automatically moves to discharging position upon the accumulation therein of a predetermined weighted amount of material; and my primary object is to provide improvements in apparatus of the character above stated to the end that the same may be caused to function in a more satisfactory manner than in the case of structures of this general character as hitherto provided, effecting substantially accurate measuring of the material and being positive in operation.

Referring to the accompanying drawings:

Figure 3 is an end view thereof, the apparatus being viewed from the right in Fig. 1.

Figure 4 is a broken view in sectional elevation of a detail of the apparatus, the section being taken at the line 4 on Fig. 3 and viewed in the direction of the arrow; and Figure 5, a broken sectional view taken at the line 5 on Fig. 4 and viewed in the direction of the arrow.

Figure 1:
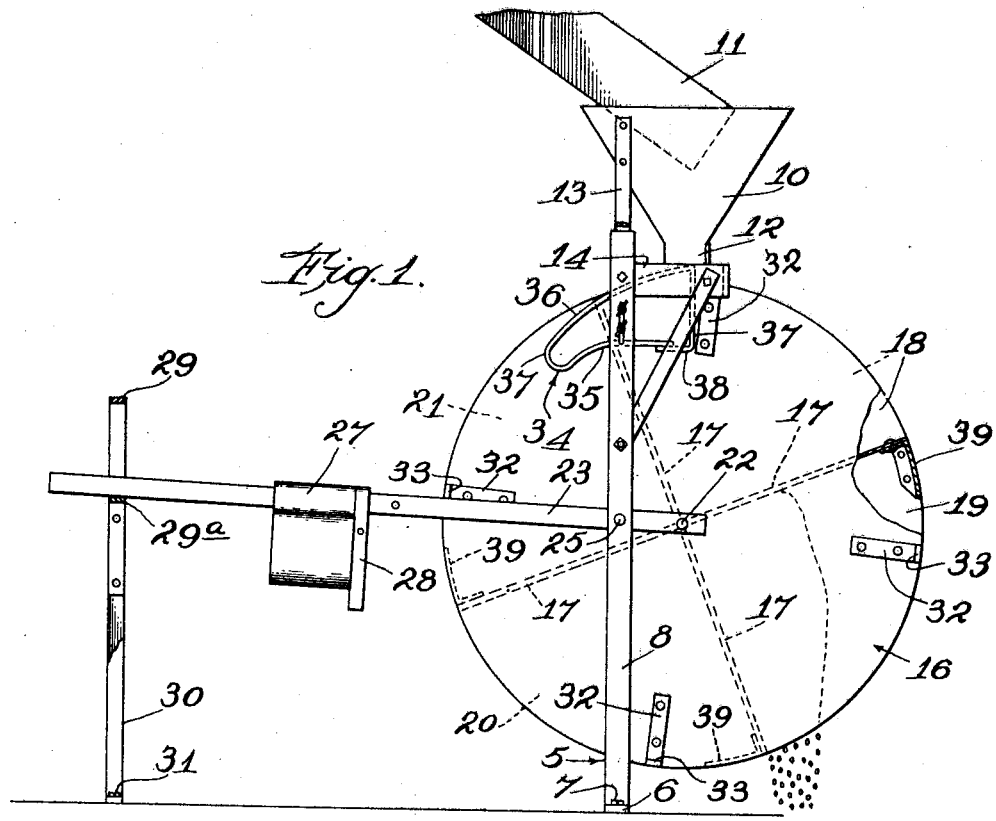
Figure 1 is a view in side elevation of measuring apparatus constructed in accordance with my invention.
Figure 2:
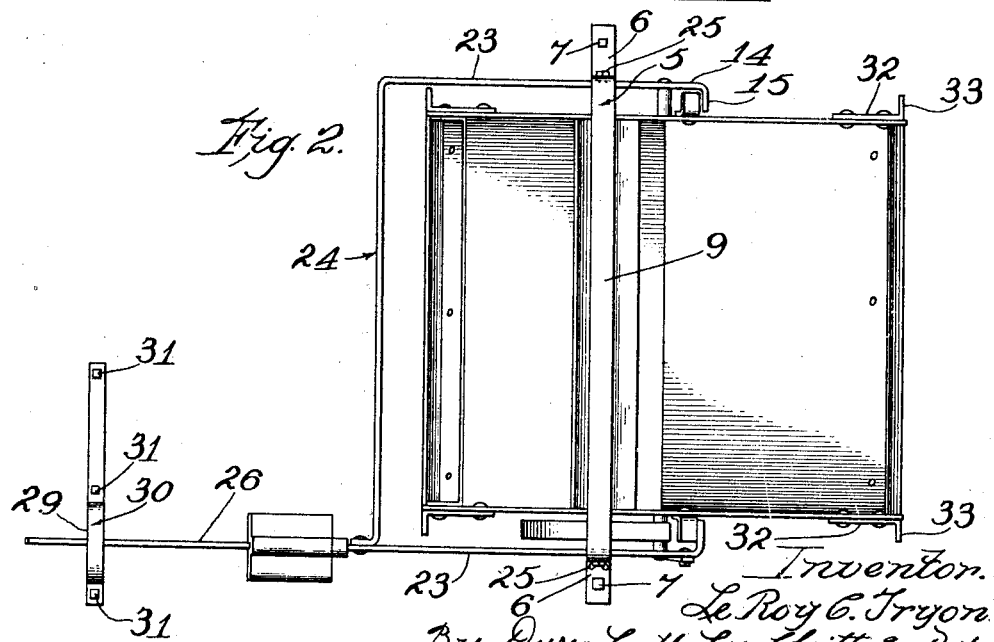
Figure 2 is a plan view of the apparatus.

The particular illustrated embodiment of my invention comprises a frame 5 rising from any suitable support, as for example from the top portion of a harvester thresher to which it is shown as secured at outwardly extending feet 6, as by means of bolts 7, this frame comprising horizontally spaced apart uprights 8 and a top cross bar 9.

The frame 5 is shown as supporting a hopper 10 into which a chute 11, through which the grain to be measured is discharged into the hopper, extends, the discharge end of the chute 11 being so related to the opposing inclined side wall of the hopper 10 that the flow of material through the outlet portion 12 of the hopper will be without turbulence.

In the particular construction shown the hopper 10 is supported by means of brackets 13 secured to the top bar 9 of the frame 5 and between which the hopper is located.

The frame 5 is provided at the upper ends of its uprights 8 with forwardly projecting arms 14 having inturned ends 15 forming stops for a purpose hereinafter described.

The apparatus also comprises a cylinder 16 divided, by intersecting partitions 17, into a plurality of compartments, in the particular construction shown the cylinder having four such compartments represented at 18, 19, 20 and 21 which open through the periphery of the cylinder. The cylinder 16 is journalled at 22 on the outer ends of parallel arm portions 23 of a frame member 24, this frame member being pivoted at its arms 23 on the uprights 8 as represented at 25. The frame 24 is thus adapted to rock at the pivot 25 on the frame 5, the frame 24 being provided with an arm extension 26 carrying a weight 27 slidable thereon into different positions of adjustment along the arm 26 and held in place by a stop member 28 likewise adjustable along the arm 26, the terminal portion of the arm 26 being movable vertically between vertically spaced stop devices 29 and 29$^a$ which serve to limit the rocking movement of the frame 24 on its pivot 25 in either direction.

The stop device 29 is shown as formed of the upper cross-bar of an upright yoke-frame 30 secured at its lower feet-equipped ends, as represented at 31, to the support to which the frame 5 is secured and the stop-device as formed of a bracket secured to the frame 30.

The cylinder 16 is provided at opposite ends with cleats 32 having outwardly extending flanges 33 the cleats at each end of the cylinder being equidistantly spaced apart about the circumference of the cylinder and provided of a number corresponding with the number of the material-receiving compartments in the cylinder. The cleats 32 are provided for cooperation with the stop members 15 for releasably maintaining the cylinder 16 against rotation until the compartment therein in registration with the hopper 10 has become filled with the predetermined weight of material.

In this connection it may be stated that the parts of the apparatus are so constructed and arranged that in the normal, non-operating, condition of the apparatus the cylinder 16 is held in the raised position shown in Fig. 1 by the action of the weight 27 in which position certain of the cleats 32 at the ends of the cylinder 16 lap the stops 15 as shown operating to restrain rotation of the drum 16 in clockwise direction in Fig. 1, these cleats 32 being so positioned as shown that when functioning as stated the one of the cylinder-receptacles adjacent to which they extend, occupies such a position, as shown in Fig. 1, that the weight of the material discharged into such compartment from the hopper 10 exerts a force tending to rotate the cylinder 16 in clockwise direction.

The weight of the material flowing into the cylinder-compartment also exerts force tending to rock the frame 24 in clockwise direction in Fig. 1, the cylinder 16 depressing in such movement, and upon the charging of the compartment with the predetermined weight of material, determined by the setting of the weight 27, the cleats 32 disengage from the stops 15 thus releasing the cylinder 6 for rotation by the material therein to discharging position as shown of the compartment 19 in Fig. 1.

In the rotation of the cylinder 16 and simultaneous flow therefrom of the material, the cylinder becomes relieved of the weight of its contents, thus rising, as it rotates, under the action of the weight 27 and causing the next pair of cleats 32 to engage the stops 15 which automatically arrest rotation of the cylinder with the next compartment therein in registration with the hopper 10 from which the material flows into this compartment to charge it with the predetermined weight of material whereupon discharge from this compartment is effected in the manner above described, the apparatus continuing to function as stated as long as material is supplied to the hopper 10.

As means for insuring the engagement of the cleats 32 with the stops 15 as stated, avoiding shock to the apparatus, insuring the stopping of the compartments, in succession, in registration with the hopper 10, and preventing rotation of the cylinder 16 in counter-clockwise direction in Fig. 1, I provide the device represented at 34 which comprises a spring metal strip bent to provide a portion 35 at which it is attached to one of the uprights 8, by means of a bracket 8$^a$ secured at its arm 8$^b$ to the portion 35 and at its other arm 8$^c$ to the upright 8 by bolts 8$^d$ shown as provided with wing nuts, an upwardly curved shoe portion 36 joined to the portion 35 by a bow portion 37, and a depending portion 37 at the upper end of the curved portion 36 and extending to the rear of, and in spaced relation to, the adjacent stop 15, the portion 37 being provided with a stop flange 38 at its lower end which normally abuts the underside of the free end of the portion 35.

The device 34 is so positioned, as shown, that its curved portion 36 extends into the path of upward movement of the portions 33 of the cleats 32 at one end of the cylinder 16 following the movement out of registration with the hopper of the compartment charged with the material, the curved portion 36 flexing downwardly as the cleat rides over it and producing a braking action, the cleat thereafter disengaging from this curved portion and becoming positioned between the portion 37 and the adjacent stop 15.

It is desirable that the degree of braking action presented by the device 34 to the cleats engaging it, in succession, be varied depending on the weight of the material being measured, the heavier the material, as for example, wheat as compared with oats, the greater the braking action desired. This is provided for by rendering the device 34 adjustable toward and away from the pivot 25 of the cylinder 16. In the arrangement shown the upright 8 is vertically slotted at 8$^e$ to receive the bolts 8$^d$ thus providing for the adjustment of the device 34 as above described.

The rear wall of each of the cylinder-compartments is preferably provided with a curved plate portion 39 extending the full length of the peripheral opening in the compartment and serving as a cut-off for the hopper as soon as the cylinder becomes lowered to a position in which it disengages from the stops 15, to ensure greater accuracy in the measuring of the material.

Furthermore, it is desired that a wiper 40 preferably of flexible material, such as leather, be provided on the hopper 10 so disposed, as shown, that the plates 39 wipe across it, in the rotation of the cylinder 16 and throw back into the compartment next to be filled any of the material which may have become deposited on these plates.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. Measuring apparatus comprising a support, a rotatable member containing a plurality of compartments, pivoting means on said support for said member yieldingly holding said member in raised position, means for directing material to be measured into said compartments in succession, co-acting stop portions one of which is stationary and the others of which are on said member and which, in the filling position of a compartment, engage and hold said member against rotation and which disengage to permit said member to rotate to discharge position by the lowering of said member responsive to the weight of the material in the compartment, and a stationarily supported device formed of a portion at which it is supported, a shoe portion flexibly connected with said supporting portion and positioned to be engaged by a part of the said first-named member in the movement of the latter to filling position and a portion connected with the free end of said shoe portion and spaced from the stationary one of said stop portions and between which the other one of said stop portions becomes interposed in the movement of said first-named member to filling position.

2. Measuring apparatus comprising a support, a rotatable member containing a plurality of compartments having plate portions at the peripheral portions of their rear walls, pivoting means on said support for said member yieldingly holding said member in raised position, means for directing material to be measured into said compartments in succession, means for holding said member from rotating in the raised position of said member and automatically releasable to permit said member to rotate to discharge position when said member lowers by the weight of the material in a compartment thereof and automatically operable to arrest rotation of said member in a position for fill-in a succeeding compartment, and a wiper adjacent said second-named means and disposed adjacent the path of movement of said plate portions, for the purpose set forth.

3. Measuring apparatus comprising a support, a rotatable member containing a plurality of compartments, pivoting means on said support for said member yieldingly holding said member in raised position, means for directing material to be measured into said compartments in succession, co-acting stop portions which, in the filling position of a compartment, engage and hold said member against rotation and which disengage to permit said member to rotate to discharge position by the lowering of said member responsive to the weight of the material in a compartment, and a yieldable shoe device engageable by said member in the rotation of the latter during its final movement to discharge position for braking said member, said shoe device being adjustable toward and away from the axis about which said member is rotatable.

LE ROY C. TRYON.